Oct. 8, 1929. J. M. BROWN 1,730,875
SWITCH MECHANISM
Filed Dec. 20, 1926
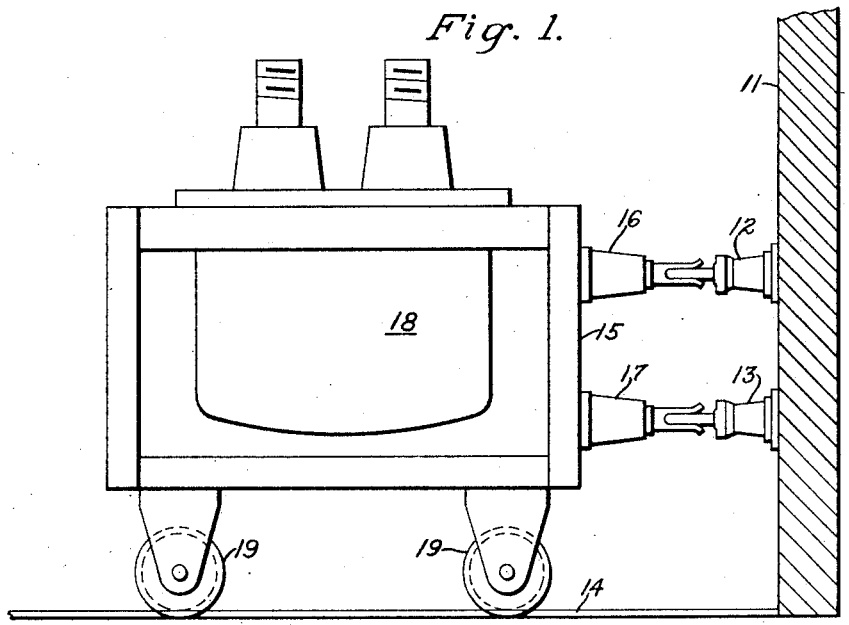
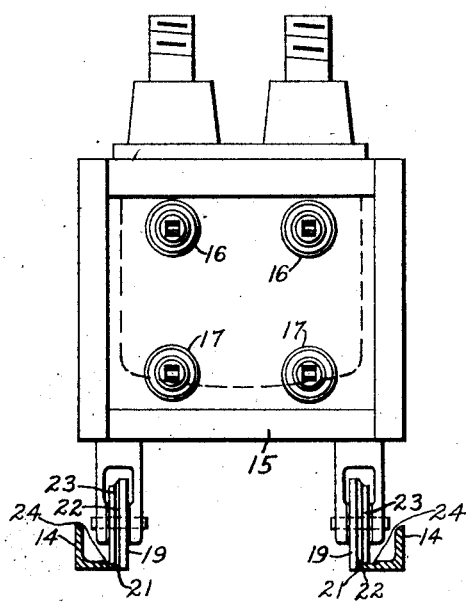
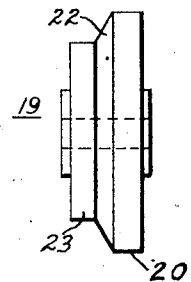
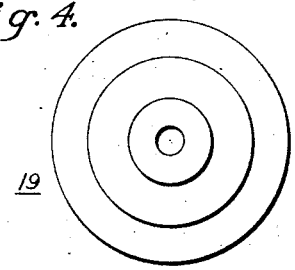
WITNESSES:
R. S. Williams
Harrison Gates
INVENTOR
James M. Brown,
By Jane D. Brown, Administratrix
BY
Wesley G. Carr
ATTORNEY Patented Oct. 8, 1929

1,730,875

UNITED STATES PATENT OFFICE

JAMES M. BROWN, DECEASED, LATE OF PITTSBURGH, PENNSYLVANIA, BY JANE D. BROWN, ADMINISTRATRIX, OF PITTSBURGH, PENNSYLVANIA, ASSIGNOR TO WESTINGHOUSE ELECTRIC & MANUFACTURING COMPANY, A CORPORATION OF PENNSYLVANIA

SWITCH MECHANISM

Application filed December 20, 1926. Serial No. 155,809.

This invention relates to switch mechanisms and particularly to switch mechanisms of the cell type.

One object of this invention is to provide a switch mechanism comprising a fixed cell structure having contact members mounted therein and a movable cell structure having contact members mounted thereon for cooperating with the fixed contact members, and means that shall cause the movable contact members to be alined with the stationary contact members during movement of the movable cell along a supporting track.

Another object of this invention is to provide a switch mechanism comprising a fixed cell structure having contact members mounted therein and a movable cell structure having contact members mounted thereon for engaging with the fixed contact members, supporting wheels having beveled portions, and means for cooperating with the beveled portions of the wheels that shall cause the movable contact members to be alined with the stationary contact members during movement of the movable switch cell along the track.

Another object of this invention is to provide a circuit interrupter comprising beveled wheels, and a track for supporting the circuit interrupter and for cooperating with the beveled portions of the wheels that shall guide the circuit interrupter as it moves along the track.

Another object of this invention is to provide a circuit interrupter comprising a plurality of wheels, one of which is provided with a beveled surface, and a track for supporting the circuit interrupter and for cooperating with the beveled wheel that shall guide the circuit interrupter as it moves along the track.

Another object of this invention is to provide a circuit interrupter comprising a plurality of wheels each having a beveled surface, and a beveled track for supporting the circuit interrupter that shall cooperate with the beveled wheels for guiding the circuit interrupter as it moves along the track.

In the accompanying drawings:

Fig. 1 is a side elevational view of a switch mechanism embodying the invention, Fig. 2 is a front elevational view of a switch mechanism embodying the invention, and Figs. 3 and 4 are enlarged edge and face views, respectively, of the wheel shown in Fig. 2.

In practicing the invention, there is provided a stationary switch cell 11, having fixed contact members 12 and 13 disposed therein, a track 14 which constitutes the base portion of the framework of the stationary cell 11, a movable cell 15 having contact members 16 and 17 mounted thereon, a circuit breaker 18 disposed on the movable cell 15, and wheels 19 for supporting the movable cell and for cooperating with the track 14 for guiding the movable cell 15 as it moves along the track 14.

The track 14 is provided with a beveled surface 21. The movable cell 15, having the contact members 16 and 17 mounted thereon, is provided with a circuit breaker 18 disposed therein, and a plurality of supporting wheels 19. The wheels 19 are provided with beveled surfaces 22 that are adapted to cooperate with the beveled surfaces 21 of the track 14 for guiding the movable cell 15 as it moves therealong.

The beveled surfaces 21 of the track 14 are at substantially the same angle as are the beveled portions 22 of the wheels 19, except that the beveled surfaces of the wheels and track are oppositely disposed in order to engage with each other. The wheels 19 are further provided with horizontal surfaces 23 that are adapted to engage and cooperate with horizontal surfaces 24 of the track 14 and with horizontal surfaces 20 that rest upon the floor when the truck is moved about outside the stationary cell-structure.

The horizontal surfaces 24 of the track 14 carry the greater part of the weight of the movable switch cell 15. The beveled surfaces 21 of the track 14 are adapted to engage and to cooperate with the beveled surfaces 22 of the wheels 19 for guiding the movable switch cell 15 and for causing the movable contact members 16 and 17, disposed thereon, to be alined with the stationary contact members 12 and 13 disposed in the stationary cell 11 during movement of the movable switch cell 15 toward or away from the stationary switch cell 11.

It will be seen from the above that there is provided a switch mechanism comprising a fixed cell having contact members mounted therein and a movable cell having contact members mounted thereon for cooperating with the fixed contact members with cooperating beveled wheels and supporting track for causing the contact members disposed on the movable switch cell to be alined with the contact members disposed in the stationary switch cell during movement of the movable switch cell toward or away from the stationary switch cell.

While there is described and illustrated but one embodiment of the invention it will be obvious to those skilled in the art that certain changes, modifications, substitutions, additions or omissions may be made in the switch mechanism above described without departing from the spirit and scope of the appended claims.

What is claimed as the invention is:

1. In a structure of the character described, means for accurately positioning a movable structure relative to a stationary structure comprising a track disposed in fixed relation to the stationary structure and a plurality of wheels for supporting the movable structure, said wheels having a floor engaging surface, a track engaging surface and a beveled surface joining the two engaging surfaces employed to aline the movable structure with the stationary structure.

2. In a structure of the character described means for accurately positioning a movable structure relative to a stationary structure comprising a track disposed in fixed relation to the stationary structure and a plurality of wheels for supporting the movable structure, each of said wheels having a beveled surface disposed between its floor-engaging surface and its rail-bearing surface for engaging the track and cooperating therewith in alining the movable structure with the stationary structure.

3. In a structure of the character described, means for accurately positioning a movable structure relative to a stationary structure comprising a beveled track disposed in fixed relation to the stationary structure, and a plurality of wheels for supporting the movable structure, said wheels having floor engaging and track engaging surfaces with a beveled surface therebetween that is disposed to engage the beveled surfaces of the track and cooperate therewith in alining the movable structure with the stationary structure.

4. In a structure of the character described, means for accurately positioning a movable structure relative to a stationary structure comprising a beveled track disposed in fixed relation to the stationary structure, and a plurality of wheels for supporting the movable structure, said wheels having floor engaging and track engaging surfaces with a beveled surface therebetween disposed to engage the beveled surfaces of the track and cooperate therewith in alining the movable structure with the stationary structure.

5. In a structure of the character described, means for accurately positioning a movable structure relative to a stationary structure comprising a beveled track disposed in fixed relation to the stationary structure, and a plurality of wheels for supporting the movable structure, each of said wheels having a beveled surface disposed between its floor-engaging surface and its rail-bearing surface for engaging the beveled track and cooperating therewith in alining the movable structure with the stationary structure.

6. In a structure of the character described, means for accurately positioning a movable structure relative to a stationary structure comprising a beveled track disposed in fixed relation to the stationary structure, and a plurality of wheels for supporting the movable structure, one of said wheels having a beveled surface between the floor-engaging and the rail-bearing surfaces disposed to engage the beveled track and cooperate therewith in alining the movable structure with the stationary structure.

In testimony whereof, I have hereunto subscribed my name this 16th day of December, 1926.

JANE D. BROWN,
*Administratrix of James M. Brown, deceased.*